(12) United States Patent
Kesho (10) Patent No.: US 10,054,815 B2
(45) Date of Patent: Aug. 21, 2018

(54) DISPLAY DEVICE

(71) Applicant: Japan Display Inc., Tokyo (JP)

(72) Inventor: Masato Kesho, Tokyo (JP)

(73) Assignee: Japan Display Inc., Tokyo (JP)

( * ) Notice: Subject to any disclaimer, the term of this patent is extended or adjusted under 35 U.S.C. 154(b) by 180 days.

(21) Appl. No.: 15/161,476

(22) Filed: May 23, 2016

(65) Prior Publication Data

US 2016/0363809 A1    Dec. 15, 2016

(30) Foreign Application Priority Data

Jun. 12, 2015    (JP) .................................. 2015-119190

(51) Int. Cl.
*G02F 1/1335* (2006.01)
*G02F 1/1333* (2006.01)

(52) U.S. Cl.
CPC .. *G02F 1/133512* (2013.01); *G02F 1/133345* (2013.01); *G02F 2001/133388* (2013.01)

(58) Field of Classification Search
None
See application file for complete search history.

(56) References Cited

U.S. PATENT DOCUMENTS

| 8,310,608 | B2 | 11/2012 | Yoshida et al. |
| 2010/0079693 | A1* | 4/2010 | Yoshida ............ G02F 1/134363 349/40 |
| 2013/0250204 | A1* | 9/2013 | Seki ................... G02F 1/133512 349/58 |
| 2014/0028961 | A1* | 1/2014 | Yanagisawa ....... G02F 1/133512 349/106 |
| 2014/0092334 | A1* | 4/2014 | Ishikawa ........... G02F 1/133512 349/42 |
| 2014/0340602 | A1* | 11/2014 | Kitajima ........... G02F 1/133512 349/42 |

FOREIGN PATENT DOCUMENTS

JP    2010-107943    5/2010

* cited by examiner

*Primary Examiner* — Ryan Crockett
(74) *Attorney, Agent, or Firm* — K&L Gates LLP (57) ABSTRACT

A display device according to an aspect of the present invention includes a first substrate, a second substrate faces the first substrate, and a light shielding layer provided on the second substrate. The second substrate has a slit that splits the light shielding layer into a first frame pattern close to the center of the second substrate and a second frame pattern away from the center. The first substrate includes a light shielding body superimposed on the slit in a region between a display area and a terminal area of the first substrate. The light shielding body includes a plurality of light shielding pieces arranged in an extending direction of the slit. The light shielding pieces adjacent to each other are arranged on different layers via an insulating layer, and are electrically insulated from each other.

6 Claims, 7 Drawing Sheets

DISPLAY DEVICE

CROSS-REFERENCE TO RELATED APPLICATIONS

This application claims priority from Japanese Application No. 2015-119190, filed on Jun. 12, 2015, the contents of which are incorporated by reference herein in its entirety.

BACKGROUND

1. Technical Field

The present disclosure relates to a display device.

2. Description of the Related Art

In display devices of horizontal electric field type in which a pixel electrode and a common electrode are formed on a first substrate, an electrode is not arranged on a second substrate on the opposite side, so that display tends to be disturbed due to influence of static electricity (for example, refer to Japanese Patent Application Laid-open Publication No. 2010-107943). To address this problem, developed is a technique for forming a slit on a light shielding layer (black matrix) arranged along an outer circumference of the second substrate to split the light shielding layer in a width direction. In this configuration, the light shielding layer is split into a first frame pattern close to the center of the second substrate and a second frame pattern away from the center thereof with the slit. Thus, fluctuation in electric potential at a peripheral part of the second substrate hardly affects the display area.

For example, the slit is arranged at a position superimposed on a plurality of pieces of routing wiring. A plurality of pieces of routing wiring function as a light shielding module for suppressing light leakage through the slit. The pieces of routing wiring are routed to a terminal area through the periphery of the display area. In a region other than a region between the display area and the terminal area, an extending direction of the slit is substantially the same as an extending direction of the pieces of routing wiring. Thus, light is favorably shielded at the slit with the pieces of routing wiring. However, in the region between the display area and the terminal area, the extending direction of the slit is different from the extending direction of the pieces of routing wiring. Due to this, light may leak through a gap between the pieces of routing wiring.

Thus, the first substrate includes a light shielding body to be superimposed on the slit in the region between the display area and the terminal area. The light shielding body is formed, for example, by using metal in a layer different from another layer including the routing wiring. However, when an elongated light shielding body is formed to traverse the pieces of routing wiring, electrostatic discharge is easily caused. When a short circuit is caused between the light shielding body and the pieces of routing wiring, the pieces of routing wiring are short-circuited via the light shielding body, and a display failure is caused.

SUMMARY

A display device according to an aspect of the present invention includes a first substrate including a display area and a terminal area, a second substrate faces the first substrate, and a light shielding layer provided on the second substrate and arranged like a frame along an outer circumference of the display area. The second substrate has a slit that splits the light shielding layer into a first frame pattern close to the center of the second substrate and a second frame pattern away from the center. The first substrate includes a light shielding body superimposed on the slit in a region between the display area and the terminal area. The light shielding body includes a plurality of light shielding pieces arranged in an extending direction of the slit. The light shielding pieces adjacent to each other are arranged on different layers via an insulating layer, and are electrically insulated from each other.

DETAILED DESCRIPTION

The following describes an embodiment in detail with reference to the drawings. The present invention is not limited to the embodiment described below. Components described below include a component that is easily conceivable by those skilled in the art and substantially the same component. The components described below can be appropriately combined. The disclosure is merely an example, and the present invention naturally encompasses an appropriate modification maintaining the gist of the invention that is easily conceivable by those skilled in the art. To further clarify the description, a width, a thickness, a shape, and the like of each component may be schematically illustrated in the drawings as compared with an actual aspect. However, this is merely an example and interpretation of the invention is not limited thereto. The same element as that described in the drawing that has already been discussed is denoted by the same reference numeral through the description and the drawings, and detailed description thereof will not be repeated in some cases.

Figure 1:
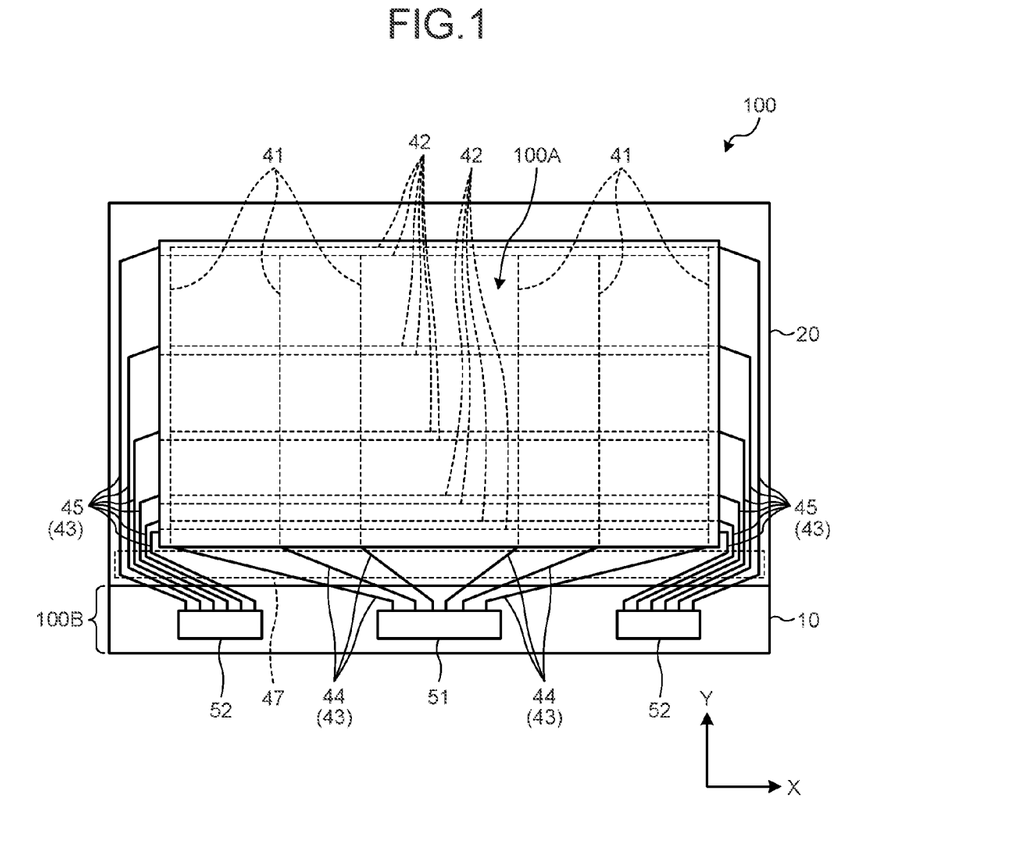
FIG. 1 is a plan view for explaining a wiring structure of a display device.
Figure 2:
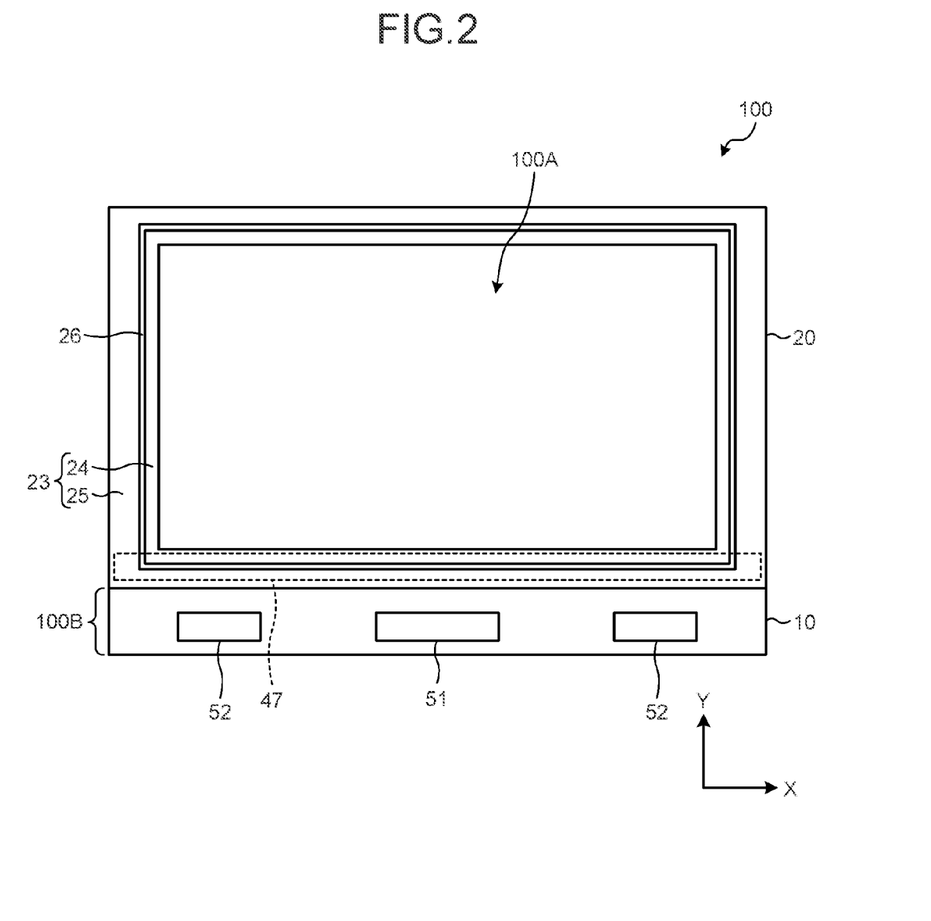
FIG. 2 is a plan view for explaining a configuration of a light shielding layer arranged on an edge of a second substrate.
Figure 3:
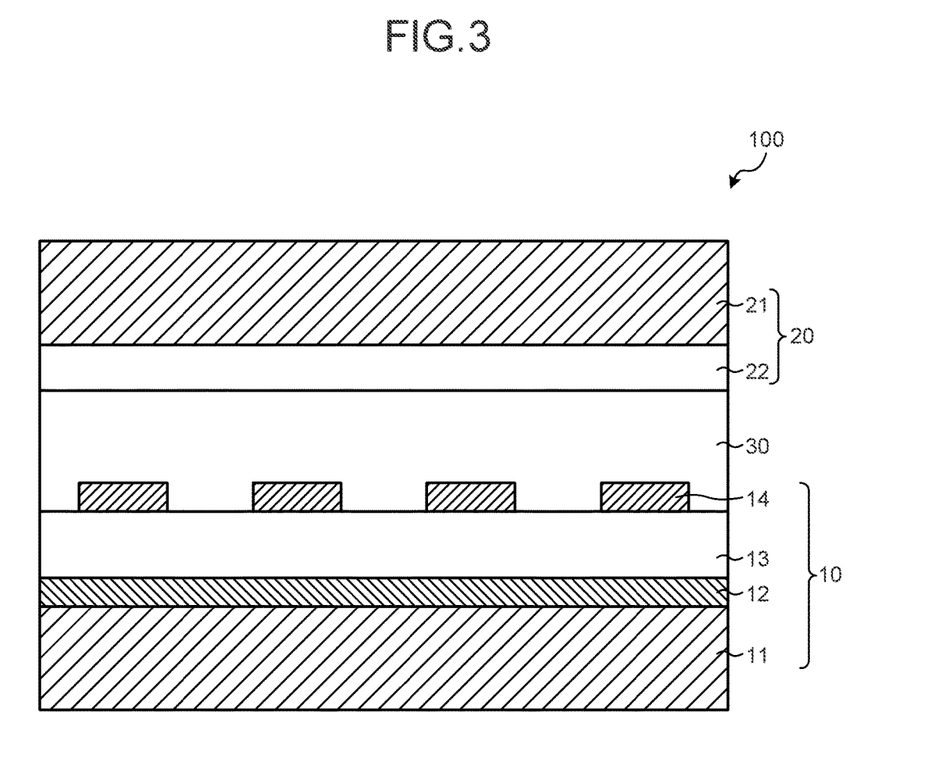
FIG. 3 is a sectional view of the display device.

FIGS. 1 and 2 are plan views of a display device 100 according to an embodiment. FIG. 1 is a plan view for explaining a wiring structure of the display device 100, and FIG. 2 is a plan view for explaining a configuration of a light shielding layer 23 arranged on an edge of a second substrate 20. FIG. 3 is a sectional view of the display device 100. The following describes an arrangement of respective members using an XYZ orthogonal coordinate system.

As illustrated in FIGS. 1 and 3, the display device 100 includes a first substrate 10 and the second substrate 20. The first substrate 10 includes a first base material 11, a first electrode 12, a capacitance insulating layer 13, and a second electrode 14. The second substrate 20 includes a second base material 21 and a color filter layer 22. The second substrate 20 is arranged facing the first substrate 10. A liquid crystal layer 30 is arranged between the first substrate 10 and the second substrate 20.

One of the first electrode 12 and the second electrode 14 is a pixel electrode, and the other one thereof is a common electrode. Orientation of the liquid crystal layer 30 is controlled by an electric field generated between the first electrode 12 and the second electrode 14. The first electrode 12 includes a portion superimposed on the second electrode 14 and a portion that is not superimposed on the second electrode 14. The orientation of the liquid crystal layer 30 is controlled by the electric field from the portion that is not superimposed on the second electrode 14 to the second electrode 14 through the capacitance insulating layer 13 and the liquid crystal layer 30. A capacitance part is a region in which the first electrode 12 is superimposed on the second electrode 14 with the capacitance insulating layer 13 interposed therebetween.

As illustrated in FIG. 1, the first substrate 10 includes a display area 100A and a terminal area 100B. The display area 100A is arranged at the center part in an opposing region in which the first substrate 10 faces the second substrate 20. The first substrate 10 is larger than the second substrate 20. A portion of the first substrate 10 projecting outside the second substrate 20 is the terminal area 100B.

A plurality of data lines 41 extending in the Y-direction and a plurality of gate lines 42 extending in the X-direction are arranged in the display area 100A. A pixel electrode (the first electrode 12 or the second electrode 14: refer to FIG. 3) is electrically coupled to each of intersection parts of the data lines 41 and the gate lines 42 via a thin film transistor. A data driver 51 and two gate drivers 52 are arranged in the terminal area 100B.

A plurality of pieces of routing wiring 43 are arranged around the display area 100A. The pieces of routing wiring 43 include a plurality of pieces of first routing wiring 44 electrically coupled to the respective data lines 41, and a plurality of pieces of second routing wiring 45 electrically coupled to the respective gate lines 42. The pieces of routing wiring 43 are routed to the terminal area 100B through the periphery of the display area 100A. The data lines 41, the gate lines 42, and the pieces of routing wiring 43 are arranged in the first base material 11 illustrated in FIG. 3.

For example, the pieces of second routing wiring 45 include wiring routed to the terminal area 100B through a region on one side (−X side) of the display area 100A, and wiring routed to the terminal area 100B through a region on the other side (+X side) of the display area 100A. The pieces of second routing wiring 45 routed to the terminal area 100B through the region on one side of the display area 100A are electrically coupled to the gate driver 52 arranged on one side of the data driver 51. The pieces of second routing wiring 45 routed to the terminal area 100B through the region on the other side of the display area 100A are electrically coupled to the gate driver 52 arranged on the other side of the data driver 51.

As illustrated in FIG. 2, the light shielding layer 23 is arranged on the edge of the second substrate 20. The light shielding layer 23 is provided on the second substrate 20 and arranged like a frame along the outer circumference of the display area 100A to rim the display area 100A. The light shielding layer 23 is arranged in the color filter layer 22 illustrated in FIG. 3. The second substrate 20 has a slit 26 that splits the light shielding layer 23 into a first frame pattern 24 close to the center of the second substrate 20 and a second frame pattern 25 away from the center thereof. The light shielding layer 23 is split in the width direction by the slit 26. Thus, fluctuation in electric potential at a peripheral part of the second substrate 20 hardly affects the display area 100A.

The slit 26 is arranged at a position superimposed on the pieces of routing wiring 43. The pieces of routing wiring 43 function as light shielding modules for suppressing light leakage through the slit 26. In a region other than the region between the display area 100A and the terminal area 100B, the extending direction of the slit 26 is substantially the same as the extending direction of the pieces of routing wiring 43. Thus, light is favorably shielded at the slit 26 with the pieces of routing wiring 43.

In the region between the display area 100A and the terminal area 100B, the extending direction of the slit 26 is different from the extending direction of the pieces of routing wiring 43. Due to this, light may leak through a gap between the pieces of routing wiring 43. To address this problem, a light shielding body 47 superimposed on the slit 26 is arranged in the region between the display area 100A and the terminal area 100B on the first substrate 10.

Figure 4:
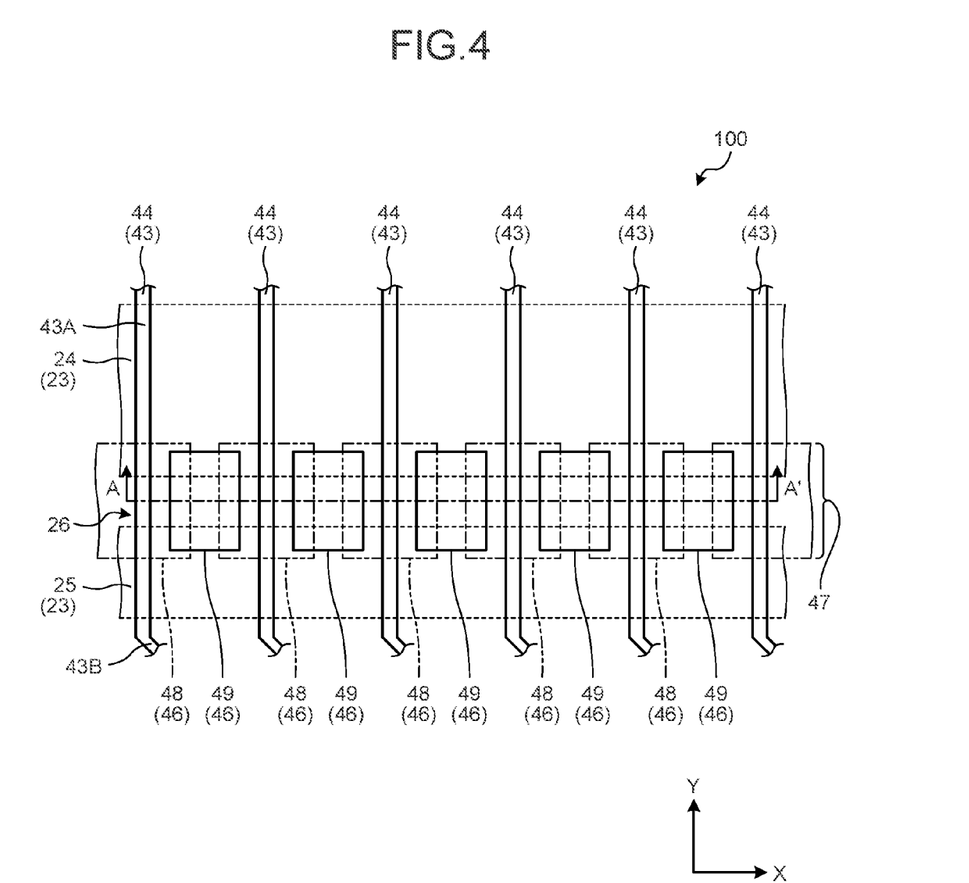
FIG. 4 is a plan view illustrating part of a light shielding body in an enlarged manner.
Figure 5:
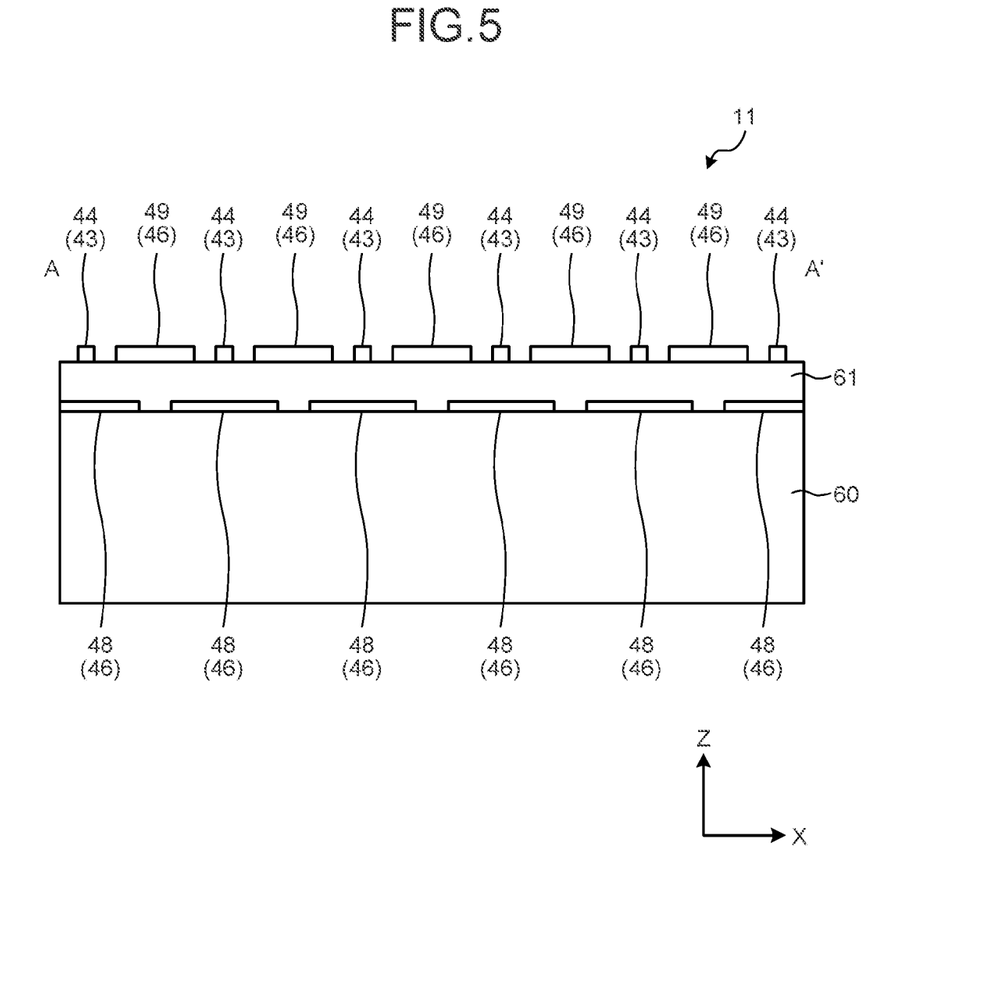
FIG. 5 is a sectional view along the line A-A' in FIG. 4.

FIG. 4 is a plan view illustrating part of the light shielding body 47 in an enlarged manner. FIG. 5 is a sectional view along the line A-A' in FIG. 4. FIGS. 4 and 5 illustrate the light shielding body 47 arranged at a portion where the pieces of first routing wiring 44 intersect with the slit 26 in an enlarged manner.

As illustrated in FIGS. 4 and 5, the light shielding body 47 includes a plurality of light shielding pieces 46 arranged in the extending direction (X-direction) of the slit 26. Adjacent light shielding pieces 46 are arranged on layers different from each other via an insulating layer 61, and are electrically insulated from each other. The number of pieces of routing wiring 43 on which each light shielding piece 46 is superimposed is, for example, equal to or smaller than one. That is, the light shielding body 47 includes a plurality of superimposed light shielding pieces that are light shielding pieces 46 superimposed on the routing wiring 43, and the number of pieces of routing wiring 43 on which each superimposed light shielding piece is superimposed is equal to one. The edges of the adjacent light shielding pieces 46 are arranged being superimposed on each other when viewed from the Z-direction (a normal direction with respect to the second substrate 20).

The light shielding body 47 includes, for example, a plurality of first light shielding pieces 48 arranged on a layer 60 different from a layer including the pieces of routing wiring 43, and a plurality of second light shielding pieces 49 arranged on a layer 61 different from the layer including the first light shielding pieces 48. The second light shielding pieces 49 are arranged on the same layer 61 as the pieces of routing wiring 43, for example, and the second light shielding pieces 49 and the pieces of routing wiring 43 are alternately arranged. The first electrode 12 illustrated in FIG. 3 is arranged in a layer closer to the liquid crystal layer 30 than the layer 61.

Each of the pieces of routing wiring 43 include, for example, a first portion 43A extending in a direction (Y-direction) orthogonal to the extending direction of the light shielding body 47, and a second portion 43B bent from the first portion 43A toward the terminal area 100B (refer to FIG. 1). The light shielding body 47 is arranged to traverse first portions 43A of the respective pieces of routing wiring 43.

In the display device 100 according to the embodiment described above, the light shielding body 47 is split into a plurality of light shielding pieces 46, so that the pieces of routing wiring 43 are rarely short-circuited with each other via the light shielding body 47 even if the light shielding body 47 and the pieces of routing wiring 43 are short-circuited with each other for some causes. For example, when the number of pieces of routing wiring 43 on which each light shielding piece 46 is superimposed is equal to or smaller than one, the short circuit between the pieces of routing wiring 43 via the light shielding body 47 is prevented more securely. In this embodiment, only two layers are used for forming the light shielding body 47, so that a layer structure of the first substrate 10 is simplified. The edges of the adjacent light shielding pieces 46 are superimposed on each other, so that light hardly leaks through a gap between the adjacent light shielding pieces 46.

In this embodiment, the light shielding body 47 is arranged to traverse the first portions 43A of the respective pieces of routing wiring 43. The second portion 43B is largely bent toward the terminal area 100B, so that a gap between the second portions 43B is smaller than a gap between the first portions 43A. Accordingly, the second light shielding piece 49 is easily formed in a region between the pieces of routing wiring 43 when the light shielding body 47 is arranged at a position traversing the first portions 43A as compared with a case in which the light shielding body 47 is arranged at a position traversing the second portions 43B. Thus, a short circuit between the pieces of routing wiring 43 via the light shielding body 47 is hardly caused.

Modification

Figure 6:
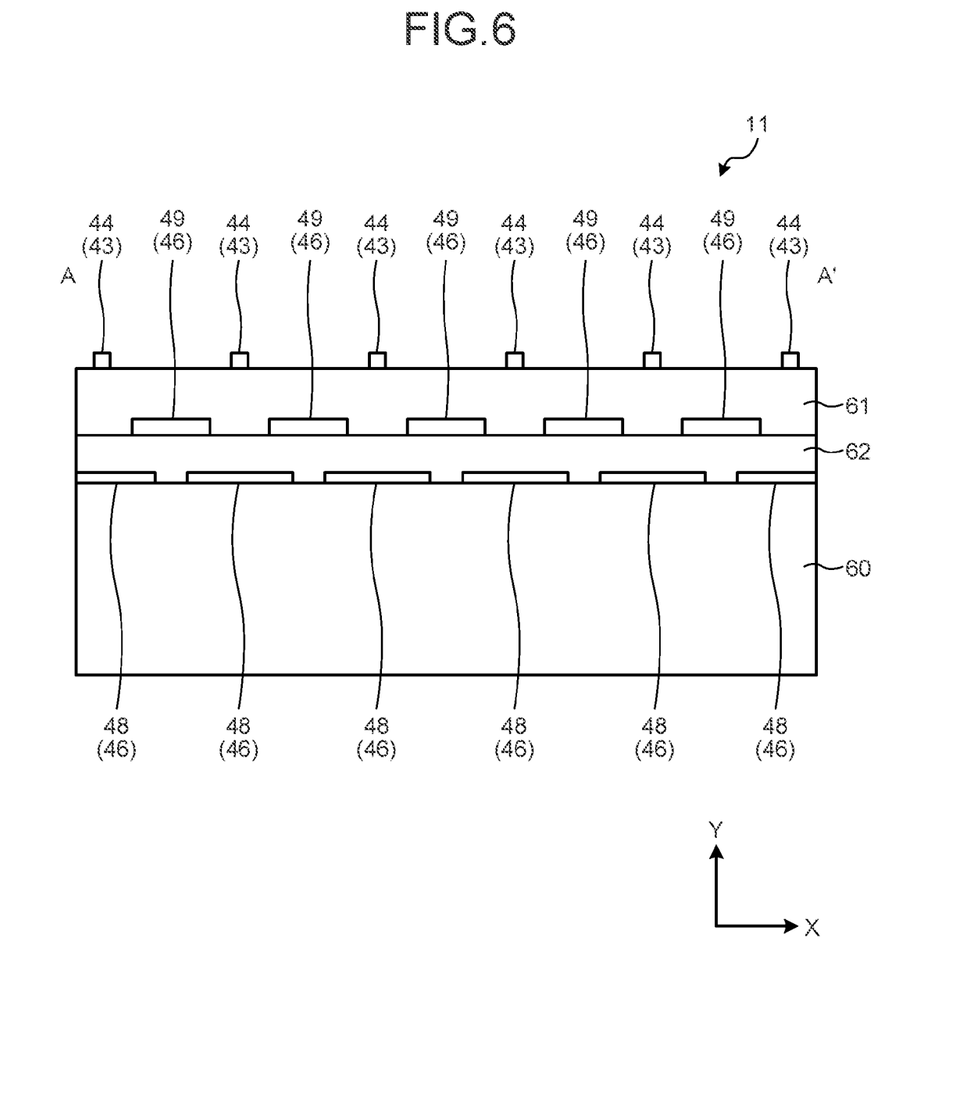
FIG. 6 is a sectional view illustrating a modification of the light shielding body.
Figure 7:
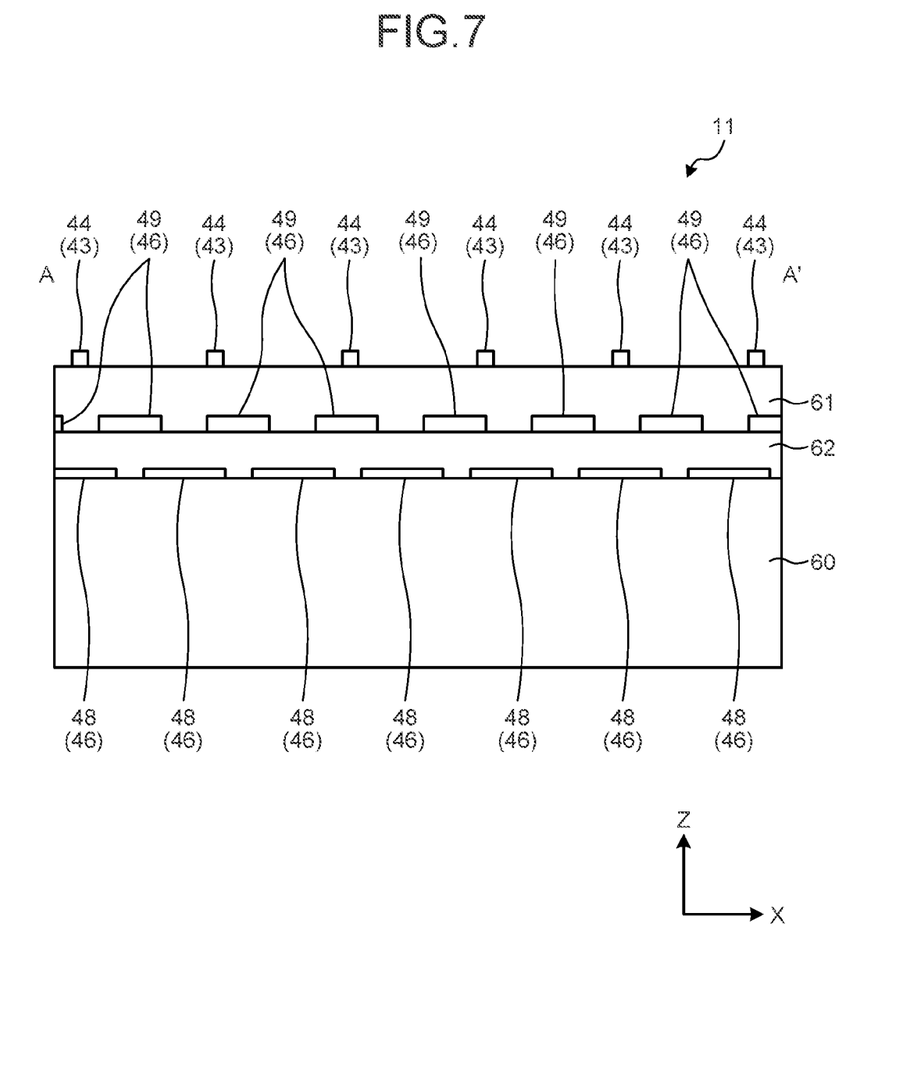
FIG. 7 is a sectional view illustrating a modification of the light shielding body.

FIGS. 6 and 7 are sectional views illustrating a modification of the light shielding body 47. In the modification illustrated in FIGS. 6 and 7, the second light shielding pieces 49 are arranged on a layer 62 different from the layer including the pieces of routing wiring 43. In the example of FIG. 6, the second light shielding pieces 49 and the pieces of routing wiring 43 are alternately arranged when viewed from the Z-direction. However, in the example of FIG. 7, they are not necessarily arranged in this manner. As illustrated in FIG. 7, when the first light shielding pieces 48 and the second light shielding pieces 49 are arranged on layers different from the layer including the pieces of routing wiring 43, arrangement of the first light shielding pieces 48 and the second light shielding pieces 49 can be relatively freely designed.

The preferred embodiment of the present invention has been described above. However, the present invention is not limited thereto. Content disclosed in the embodiment is merely an example, and various modifications can be made without departing from the gist of the invention. The present invention naturally encompasses an appropriate modification maintaining the gist of the invention. The present invention also encompasses any invention that can be implemented by those skilled in the art by appropriately modifying design of the invention described above while maintaining the gist of the invention.

For example, in the above embodiment, the light shielding pieces 46 are arranged separately on the two layers. Alternatively, the light shielding pieces 46 may be arranged separately on three or more layers. In the above embodiment, exemplified is the display device 100 of horizontal electric field type in which the orientation of the liquid crystal layer 30 is controlled by the electric field between the first electrode 12 and the second electrode 14 that are arranged on the same substrate. However, a display type of the display device 100 is not limited to the horizontal electric field type. The configuration according to the embodiment described above can be applied to display devices of vertical electric field type such as a vertical alignment (VA) type and a twisted nematic (TN) type.

What is claimed is:

1. A display device comprising:
   a first substrate including a display area and a terminal area;
   a second substrate facing the first substrate; and
   a light shielding layer provided on the second substrate and arranged like a frame along an outer circumference of the display area, wherein
   the second substrate has a slit that splits the light shielding layer into a first frame pattern close to the center of the second substrate and a second frame pattern away from the center,
   the first substrate includes a light shielding body superimposed on the slit, the light shielding body being arranged in a region between the display area and the terminal area,
   the light shielding body includes a plurality of light shielding pieces arranged in an extending direction of the slit,
   the light shielding pieces adjacent to each other are arranged on different layers via an insulating layer, and are electrically insulated from each other,
   the first substrate includes a plurality of pieces of routing wiring, the pieces of routing wiring being routed to the terminal area through the periphery of the display area,
   the light shielding body includes a plurality of superimposed light shielding pieces that are light shielding pieces superimposed on the routing wiring, and
   the number of pieces of routing wiring on which each superimposed light shielding piece is superimposed is equal to one.

2. The display device according to claim 1, wherein the light shielding body includes a plurality of first light shielding pieces arranged on a layer different from a layer including the pieces of routing wiring, and a plurality of second light shielding pieces arranged on a layer different from the layer including the first light shielding pieces.

3. The display device according to claim 2, wherein
   the second light shielding pieces are arranged on the same layer as the layer of the pieces of routing wiring, and
   the second light shielding pieces and the pieces of routing wiring are alternately arranged.

4. The display device according to claim 1, wherein
   each of the pieces of routing wiring includes a first portion extending in a direction orthogonal to an extending direction of the light shielding body and a second portion bent from the first portion toward the terminal area, and
   the light shielding body is arranged to traverse the first portion of each of the pieces of routing wiring.

5. The display device according to claim 1, wherein edges of the adjacent light shielding pieces are arranged being superimposed on each other.

6. The display device according to claim 1, wherein
   a liquid crystal layer is arranged between the first substrate and the second substrate,
   the first substrate includes a first electrode and a second electrode, and
   orientation of the liquid crystal layer is controlled by an electric field generated between the first electrode and the second electrode.

* * * * *